E. BERGMAN.
LEAD LINE CONTROLLER.
APPLICATION FILED JUNE 26, 1916.

1,214,125.

Patented Jan. 30, 1917.

Inventor:
Erick Bergman
By ____
Attorneys.

UNITED STATES PATENT OFFICE.

ERICK BERGMAN, OF WAYSIDE, MISSISSIPPI.

LEAD-LINE CONTROLLER.

1,214,125.  Specification of Letters Patent.  Patented Jan. 30, 1917.

Application filed June 26, 1916. Serial No. 105,969.

*To all whom it may concern:*

Be it known that I, ERICK BERGMAN, a citizen of the United States, residing at Wayside, in the county of Washington and State of Mississippi, have invented new and useful Improvements in Lead-Line Controllers, of which the following is a specification.

This invention relates to a seining apparatus and has for its principal object to provide a means for guiding the lead line of a seine, after the same has been laid in the water in a large circle by a boat and then brought back to the starting point, where one end of the seine has been secured to an upright pole in the water known as a "brail." At this point the lead line is connected to the device forming the subject-matter of this invention, and is lowered into the water to the bottom and secured at top, bottom and intermediate these ends, to the stern of the boat. The lead line is then drawn in by suitable machinery on the boat, being held at all times close to the bottom of the body of water being seined, by guide pulleys on the lower end of the device. After sufficient seine has been drawn in to greatly lessen the loop and gather the fish therein into a box-seine or purse-seine placed between the fixed end of the "round-up" seine, as the large seine is called, and the guiding device, the latter is drawn up and, with the seine and catch, loaded into the boat.

Another object of the invention is to provide means whereby the device is held firmly in place against the bottom of the river or lake but, by reason of its broad base, is prevented from being buried in the soft mud on the bottom. The device can turn laterally without trouble to accommodate the varying positions of the seine as it is being drawn in, and thus prevent entanglement of the seine with the device and keep the pulleys in alinement with the lead line.

Figure 1:
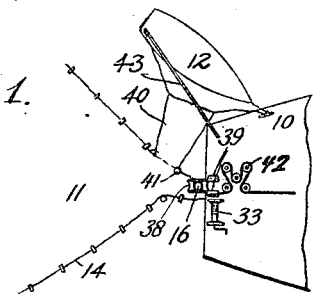
Figure 3:
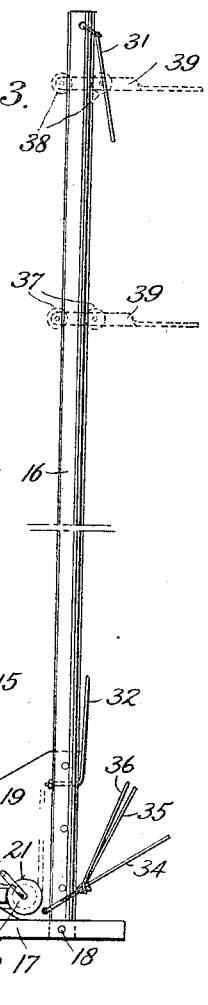
Figure 2:
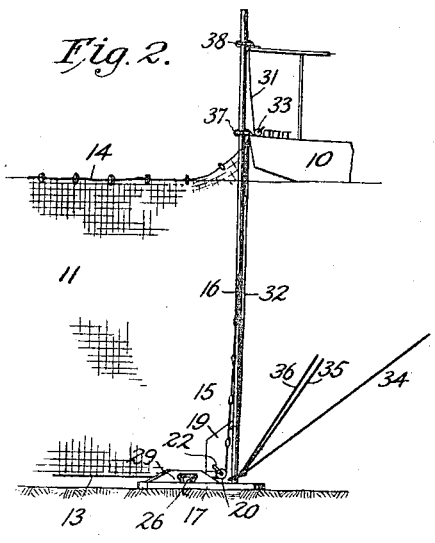
Figure 4:
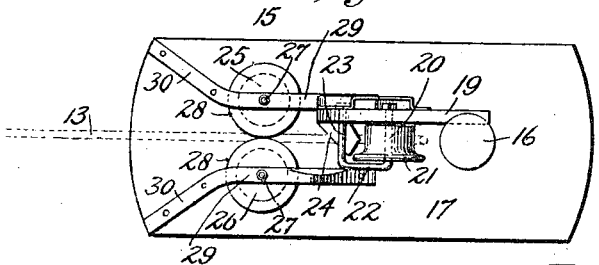

With these as the principal objects in view, and other objects to be set forth in detail hereinafter, the invention consists of the combination and arrangement of parts now to be described, and illustrated in the accompanying drawings, in which:

Figure 1 is a diagrammatic plan view of the manner of using the apparatus, Fig. 2 is a side elevation of the same, Fig. 3 is an enlarged elevation of the removable pole with the lead line guides, bracing cables and raising and lowering lines in place thereon, and Fig. 4 is a plan view of the same.

In the drawings, 10 indicates a fishing boat and 11 a large seine known as a "round-up" seine, that is loaded on the boat and carried to the fishing grounds where one end is secured to a small boat 12 that accompanies the fishing boat and is anchored when the fishing grounds are reached. The boat 10 then moves out from the small boat 12 and describes a circular course, paying out the seine all the time, one edge of which is carried to the bottom by the lead line 13 while the other is held at the surface of the water by the cork or float line 14. The circle described by the boat varies according to the length of the seine, which may be from five hundred yards to a mile long. Upon nearing the small boat 12 on its return, the boat 10 anchors and places in the water the lead line guide 15, now to be described.

The lead line guide 15 comprises a pole 16 of a suitable length to reach from the bottom of the water to some point above the cabin of the boat 10. The bottom of the pole is fastened to a broad base 17, which may be wood, metal or other material, by making a hole in the base for the pole and fastening it by a transverse bolt 18. Bolted or fastened in any other manner against one side of the pole at the bottom is a vertical plate 19 that projects over and in contact with the base 17, or if desired, a mortise may be made in the base for the lower end of said plate. Mounted on a horizontal axis on one side of the plate 19 is a pulley 20 having one or two side flanges 21 to guide the lead line 13. A yoke or U-shaped support 22 is here shown as carrying the pulley 20, one leg of said support serving as a pivot therefor, while the other leg 23 extends over the top of the pulley and serves as a guard to keep the seine away from entanglement with the pulley. These two legs extend through the plate 19 and are fastened by nuts on the opposite side. A second guard in the form of a horizontal block 24 projects from the plate 19 across the front of the pulley 20, the side of which block opposite the side facing the pulley being beveled from the edge of plate 19 to the flange 21 on the outside of the pulley to deflect the net of the seine, as the lead line passes, from entanglement with the pulley and being broken.

Spaced a short distance from the pulley 20 are two upright pulleys 25 and 26 turning on pivots 27 that rise vertically from the base 17. The pulleys 25 and 26 are spaced apart to permit the lead line 13 passing between them to pulley 20. The line is prevented from becoming disengaged from the vertical pulleys by a lateral flange 28 on the top of each pulley, said flanges being close together, thus forming a barrier that holds the lead line in place. An upright bearing 29 extends over each pulley, said bearings being fastened on the base 17 and serving as supports for the upper ends of the pivots 27. In front of the pulleys 25 and 26, the bearings 29 are deflected outward at an angle or away from the path of the lead line as at 30, to provide a wide mouth for the lead line to enter and be guided to the pulleys.

Fastened securely at the top of the pole 16 is a line 31, a similar line 32 is connected to the pole near the base 17. By means of these lines the pole is forced to the bottom of the water and raised again into the boat 10. A windlass 33, mounted on the stern of the fishing boat in a convenient place, serves to haul these lines when necessary. Other lines 34, 35 and 36, fastened at the bottom of the pole just above the base 17, are carried upward to the bow and sides of said boat and there attached and serve as guys to assist in maintaining the pole upright against the weight and draft of the lead line when the latter is hauled in.

The top of the pole projects above the boat cabin and is held close to the boat by means of guide rollers 37 on the boat and like rollers 38 on the top of the boat cabin or other convenient overhead support. The rollers 37, two in number, have concave peripheries that bear lightly on the front and rear of the pole 16 and turn on bolts mounted in brackets 39 attached to the boat deck. Like brackets carry the rollers 38 and are fastened on the cabin top. This connection holds the boat securely to the pole and also permits the boat to rise and fall and swing to a limited extent about the pole.

In the use of this device, 15, it is supported at the stern of the boat 10 by the rollers 37, 38, in elevated position, with the base 17 at the surface of the water, and, with the seine loaded on the boat to pay out evenly, and taken to the fishing ground. The small boat 12, bearing a purse net or trap seine 40, is towed along. On arriving at the fishing ground, a stake 41 is threaded through one side of the mouth of the purse seine 40, and the lead line 13 of the seine 11 is fastened thereto. The boat 10 then moves in a large circle, paying out and laying the seine, and returns to a point near the start and anchors. The end of the lead line 13 fastened to stake 41 is then extended to the holder 15 and attached to a ring in the bottom thereof. The purse net 41 is thrown overboard from the small boat and the inner rear corner fastened to the side of the fishing boat 10, to which the bow of the small boat is also secured. The other rear corner of the purse net is fastened to the stern of the small boat and a pole 43 extended from the stern of the fishing boat to the stern of the small boat. This holds the mouth of the purse seine open. The lead line guide 15 with the lead line 13 between rollers 25, 26, and under roller 20 is then lowered and the base forced to the bottom. If necessary, the line 31 from the top of the pole 16 is attached to the windlass and the latter operated to lower the pole. The guy lines 34, 35 and 36 are then secured to the boat and the seine is ready for hauling.

When hauling, the cork or float line 14 is pulled in the boat simultaneously with the lead line 13 by a winding apparatus 42 driven by a light motor, such as a gasolene engine. The lead line, which had been placed between the pulleys 25, 26, and under pulley 20, and the cork line 14 are attached to the drum of the winding apparatus and the latter started. The lead line 13, as it is being drawn into the boat, is held close to the bottom of the river by the flanges 29 on the pulleys 25, 26 to prevent the escape of fish; the seine net, however, passes easily between the flanges. The line 13 then turns around pulley 20 and passes up to the boat and to the winding apparatus the guards 23, 24 keeping the net away from entanglement with the pulley.

After the catch has been taken, the device 15 is raised either by hand or by attaching the lower line 32 to the windlass 33 and turning the latter. The rollers 37, 38, will of course have to be disconnected when it is desired to remove the pole 16 from between them.

I claim:

1. In a seining apparatus, a pole or standard adapted to be held in an upright position on the bottom of a stream, lake or the like, a broad supporting base on the lower end of said pole, a horizontally pivoted pulley adjacent the lower end of said pole for directing a lead line, guards in front of said pulley to protect the net from entanglement therewith, two vertically pivoted pulleys on said base each having a horizontal flange on its upper face, said flanges being close together to maintain the lead line between the pulleys, and means for raising and lowering the pole.

2. In a seining apparatus, a pole or standard adapted to be held in upright position on the bottom of a stream, lake or the like, a broad flat base on the lower end of said pole, a vertical plate attached to said pole and said base, a horizontally pivoted pulley mounted on said plate, guards in front of and above said pulley to prevent entanglement of a seine net with the pulley, two pulleys vertically pivoted on said base each having a horizontal flange on its upper face, said flanges being close together to maintain the lead line between the pulleys, bearings above said latter pulleys having forwardly projecting spreading ends to form an entrance for the lead line to the pulleys, a raising line attached to the bottom of the pole, a lowering line attached to the top of the pole, and a plurality of guy lines fastened on said pole.

In testimony whereof I affix my signature.

ERICK BERGMAN.

Copies of this patent may be obtained for five cents each, by addressing the "Commissioner of Patents, Washington, D C."